United States Patent
Bharathraj et al.

(10) Patent No.: US 11,670,953 B2
(45) Date of Patent: Jun. 6, 2023

(54) BATTERY MANAGEMENT SYSTEM AND BATTERY CHARGING CONTROL METHOD

(71) Applicant: Samsung Electronics Co., Ltd., Suwon-si (KR)

(72) Inventors: Sagar Bharathraj, Bengaluru (IN); Shashishekara Parampalli Adiga, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 17/083,398

(22) Filed: Oct. 29, 2020

(65) Prior Publication Data

US 2021/0135475 A1     May 6, 2021

(30) Foreign Application Priority Data

Nov. 2, 2019 (IN) .............................. 201941044490
Aug. 12, 2020 (IN) .............................. 201941044490
Sep. 29, 2020 (KR) ........................ 10-2020-0127268

(51) Int. Cl.
*H02J 7/00*      (2006.01)
*H01M 10/42*      (2006.01)
*H01M 10/0525*      (2010.01)
*H01M 10/44*      (2006.01)

(52) U.S. Cl.
CPC ... *H02J 7/007182* (2020.01); *H01M 10/0525* (2013.01); *H01M 10/425* (2013.01); *H01M 10/446* (2013.01); *H01M 2010/4271* (2013.01)

(58) Field of Classification Search
USPC ................. 320/114, 115, 128, 129, 136, 137
See application file for complete search history.

(56) References Cited

U.S. PATENT DOCUMENTS

| | | | |
|---|---|---|---|
| 9,985,466 B2 | 5/2018 | Lee et al. | |
| 2004/0124810 A1* | 7/2004 | Smallwood | H02J 7/00712 320/128 |
| 2016/0064979 A1* | 3/2016 | Huang | H02J 7/0071 320/114 |
| 2016/0087461 A1 | 3/2016 | Greening et al. | |
| 2016/0336763 A1 | 11/2016 | Khandelwal et al. | |
| 2017/0070061 A1 | 3/2017 | Barsukov et al. | |

(Continued)

FOREIGN PATENT DOCUMENTS

| | | |
|---|---|---|
| JP | 2005110339 A * | 4/2005 |
| KR | 10-2017-0116816 A | 10/2017 |
| KR | 20190083950 A * | 7/2019 |

*Primary Examiner* — Brian Ngo
(74) *Attorney, Agent, or Firm* — NSIP Law (57) ABSTRACT

A battery management system and method to control charging of a battery is provided. The system determines whether a current capacity of the battery is greater than a predetermined threshold percentage of an original rated capacity of the battery, in response to initiation of a charging cycle of the battery being detected, controls the battery to be charged with a first voltage, in response to the current capacity of the battery being determined to be greater than the predetermined threshold percentage of the original rated capacity of the battery, and controls the battery to be charged with a second voltage, in response to the current capacity of the battery being determined to be less than or equal to the predetermined threshold percentage of the original rated capacity of the battery.

20 Claims, 8 Drawing Sheets

(56) References Cited

U.S. PATENT DOCUMENTS

| | | | |
|---|---|---|---|
| 2018/0145527 A1* | 5/2018 | Ravi | H02J 7/0069 |
| 2018/0194245 A1* | 7/2018 | Mohr | H02J 7/0029 |
| 2018/0321730 A1 | 11/2018 | Mandli et al. | |
| 2018/0351381 A1 | 12/2018 | Shin et al. | |
| 2019/0006871 A1 | 1/2019 | Barsukov et al. | |
| 2019/0353711 A1* | 11/2019 | Paulose | H01M 10/425 |
| 2020/0343743 A1* | 10/2020 | Kwok | H02J 7/00711 |

\* cited by examiner

BATTERY MANAGEMENT SYSTEM AND BATTERY CHARGING CONTROL METHOD

CROSS-REFERENCE TO RELATED APPLICATION(S)

This application claims the benefit under 35 U.S.C. § 119(e) of provisional Indian Patent Application No. 201941044490, filed on Nov. 2, 2019, in the Intellectual Property INDIA and under 35 U.S.C. § 119(a) of Indian Patent Application No. 201941044490, filed on Aug. 12, 2020, in the Intellectual Property INDIA, and under 35 U.S.C. § 119(a) of Korean Patent Application No. 10-2020-0127268, filed on Sep. 29, 2020, in the Korean Intellectual Property Office, the entire disclosures of which are incorporated herein by reference for all purposes.

BACKGROUND

1. Field

The following description relates to a battery management system and a battery charging control method.

2. Description of Related Art

Rechargeable batteries play an important role in clean energy storage environments. Among such batteries, lithium-ion batteries (LIBs) have dominated the battery-related industry for over 20 years, with little competition. The dominance of LIBs may be attributed to the stability, durability and energy density that are provided for a wide range of applications including applications that use very high power and/or energy. These advantages come from well-known properties of low self-discharge and low maintenance. As demands for home appliances, power grids, and electric vehicles continue to increase, LIBs have evolved to meet challenges and survived even if not exceeding expectations.

In an era that is focused on enhancing user experience, it is important that battery lifespan and cell performance are improved. The charging of a battery is an important aspect with regard to the lifespan of the battery. However, most protocols fail to address issues such as battery ageing. Lifespan-related degradation is inevitable, and coupled with failures through operational constraints, the lifespan of LIBs may typically be limited to 2 to 3 years. Thus, one of key challenges facing widespread adoption of battery technology is to limit an ability to provide an acceptable level of power and store/dispense an appropriate amount of energy as needed, as the electrochemical cells age. Thus, there is a need for an optimized charging protocol that prioritizes battery health.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a battery management system (BMS) includes a charging controller, configured to charge a battery; and a charging monitor configured to: detect an initiation of a charging cycle of the battery, determine whether a current capacity of the battery is greater than a predetermined threshold percentage of an original rated capacity of the battery in response to a detection of the initiation of the charging cycle of the battery, control the charging controller to charge the battery with a first voltage in response to the current capacity of the battery being determined to be greater than the predetermined threshold percentage of the original rated capacity of the battery, and charge the charging controller to charge the battery with a second voltage in response to the current capacity of the battery being determined to be less than or equal to the predetermined threshold percentage of the original rated capacity of the battery.

The system may further include a storage comprising a value of the first voltage, wherein the charging monitor is further configured to identify the value of the first voltage in the storage in response to the current capacity of the battery being determined to be greater than the predetermined threshold percentage of the original rated capacity of the battery.

The second voltage may be equal to a sum of the first voltage and a predetermined voltage.

The system may further include a storage comprising a value of the first voltage and a value of the second voltage, wherein the charging monitor is configured to identify the value of the second voltage in the storage in response to the current capacity of the battery being determined to be less than or equal to the predetermined threshold percentage of the original rated capacity of the battery.

The charging controller may be further configured to update the value of the first voltage by adding a value of the predetermined voltage to the value of the first voltage, and to store the updated value of the first voltage in the storage to be implemented in a subsequent charging cycle of the battery, in response to the current capacity of the battery being determined to be less than or equal to the predetermined threshold percentage of the original rated capacity of the battery.

The predetermined voltage may be 0.01 millivolt (mV), and the first voltage may be 4.2 volts (V).

The battery may be a lithium-ion battery.

In a general aspect, a method of controlling charging of a battery includes detecting an initiation of a charging cycle of the battery; determining whether a current capacity of the battery is greater than a predetermined threshold percentage of an original rated capacity of the battery, in response to a detection of the initiation of the charging cycle of the battery; controlling the battery to be charged with a first voltage, in response to the current capacity of the battery being determined to be greater than the predetermined threshold percentage of the original rated capacity of the battery; and controlling the battery to be charged with a second voltage, in response to the current capacity of the battery being determined to be less than or equal to the predetermined threshold percentage of the original rated capacity of the battery.

The controlling of the battery to be charged with the first voltage may include identifying a value of the first voltage in a storage space including the value of the first voltage.

The second voltage may be equal to a sum of the first voltage and a predetermined voltage.

The controlling of the battery to be charged with the second voltage may include identifying a value of the second voltage in a storage space including a value of the first voltage and the value of the second voltage.

The method may include updating the value of the first voltage by adding a value of the predetermined voltage to the value of the first voltage, in response to the current capacity of the battery being determined to be less than or equal to the predetermined threshold percentage of the original rated capacity of the battery; and storing the updated value of the first voltage in the storage space to be implemented in a subsequent charging cycle of the battery.

The predetermined voltage may be 0.01 millivolt (mV), and the first voltage may be 4.2 volts (V).

The battery may be a lithium-ion battery.

In a general aspect, a method of controlling charging of a battery includes detecting an initiation of a charging cycle of the battery; determining whether a current capacity of the battery exceeds an original rated capacity of the battery when the battery is charged with a second voltage, in response to a detection of the initiation of the charging cycle of the battery; controlling the battery to be charged with a first voltage, in response to the current capacity of the battery being determined to exceed the original rated capacity of the battery; and controlling the battery to be charged with a second voltage, in response to the current capacity of the battery being determined to be less than or equal to the original rated capacity of the battery.

The determining of whether the current capacity of the battery exceeds the original rated capacity of the battery when the battery is charged with the second voltage may include: accessing voltage-capacity mapping information stored in a storage space, the voltage-capacity mapping information comprising mapping information between a plurality of voltages and a plurality of capacities; identifying a capacity value corresponding to the second voltage based on the voltage-capacity mapping information; determining whether the identified capacity value is greater than the original rated capacity of the battery; determining that the current capacity of the battery exceeds the original rated capacity of the battery when the battery is charged with the second voltage, in response to the identified capacity value being greater than the original rated capacity; and determining that the current capacity of the battery is less than or equal to the original rated capacity of the battery when the battery is charged with the second voltage, in response to the identified capacity value being less than or equal to the original rated capacity.

The second voltage may be equal to a sum of the first voltage and a predetermined voltage.

The method may include identifying a value of the second voltage in a storage space including a value of the first voltage and the value of the second voltage.

The determining that the current capacity of the battery is less than or equal to the original rated capacity of the battery may include updating a value of the first voltage by adding a value of a predetermined voltage value to the value of the first voltage; and storing the updated value of the first voltage in the storage space to be implemented in a subsequent charging cycle of the battery.

The first voltage may be 3.5 volts (V).

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising,"

when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms including technical or scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings, and like reference numerals in the drawings refer to like elements throughout.

Lithium-ion batteries (LIBs) are widely used as power sources in application fields ranging from electric vehicles to portable electronic devices due to their excellent energy and power densities, stability, durability and round-trip efficiency. The above strengths may be complemented by desirable properties of low self-discharge and low maintenance. However, LIBs go through a complex degradation process during cycling, and rates thereof vary depending on operating conditions such as a temperature or charging and/or discharging protocols, which may lead to limitation in a cycle life of LIBs, and accordingly battery replacement may be required. Continuous efforts to overcome limits of LIBs using aggressive charging protocols to achieve a higher energy density (for example, by using a higher charging cutoff voltage) further aggravates a tendency of the battery to deteriorate. Thus, it is highly desirable to identify a chemical process that leads to battery degradation and electrochemically links an effect of a charging protocol to degradation, and it is also desirable to achieve optimized charging protocols that minimize degradation.

A current charging algorithm, as an example of a widely used constant current constant voltage (CCCV) algorithm, implements an approach in which a predefined voltage cut-off value as indicated by a battery manufacturer is used, and this protocol remains unchanged throughout a lifespan of a battery. The current charging algorithm uses static bounds on voltage values and current values, regardless of details of electrochemical processes, and are thus inert to battery dynamics. In a constant current (CC) phase, a charging current may be pumped to a system so that a voltage may increase to reach a cut off value, which may result in fast charging. To utilize the remaining capacity, the current may be exponentially reduced in a second phase of charging to a preset value at a constant voltage (CV), which may result in slow charging known as a CV phase. The CC phase, the CV phase and a combination thereof are used in varying proportions, depending on an application, to achieve a desired capacity in a given time. Since parameters of a charging protocol are static, the parameters are not optimized with respect to minimizing battery degradation, and the extent of which gradually increases based on a number of cycles. An optimal charging protocol may include temporal dynamics of degradation reaction rates and a dependence on operating conditions, and may be anticipated to electrochemically provide information about details of a degradation process and strike a balance between a performance and cycle life of a battery. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Generally, when a performance of a battery degrades and an available capacity falls below 80% of an original rated capacity, the battery may be discarded. Capacity fading caused by degradation is an inevitable phenomenon, and a challenge is to extend a cycle life of the battery instead of having an influence on an extractable capacity and battery performance. Since a cycle life of an LIB is typically limited to 2,000 cycles of charging and discharging, a user who uses a battery for 2,000 cycles or greater may have to replace the battery, thus resulting in an additional cost burden. Mechanisms responsible for the above inevitable phenomenon of degradation may include, as non-limiting examples, a solid electrolyte interphase (SEI) formation, an Li metal plating, a dendrite formation, an active material loss (AM), a loss of lithium inventory (LLI), or a metal dissolution. Most of the above degradation mechanisms and ramifications thereof are correlated to extremities of operational voltage windows where studies point out to usage of lower voltage cut-offs for better retention of an available capacity. For example, metal oxide cathodes (with a metal such as Co, Mn, Ni, or Ti), and blends thereof that are known for high voltage-high capacity (HV-HC) applications may be degraded at high voltage windows, and anodes may undergo an SEI formation at low voltages.

A model-based optimization of a charging protocol to extend a cycle life has been reported in the past, but the knowledge of degradation is not coupled to the charging protocol to utilize a function of a cell at the maximum level.

The examples address at least one of the aforementioned deficiencies, and provide a method of charging a battery based on intricate physics associated with degradation occurring in electrochemical batteries. Examples will be described below in detail with reference to the accompanying drawings.

Figure 1A:
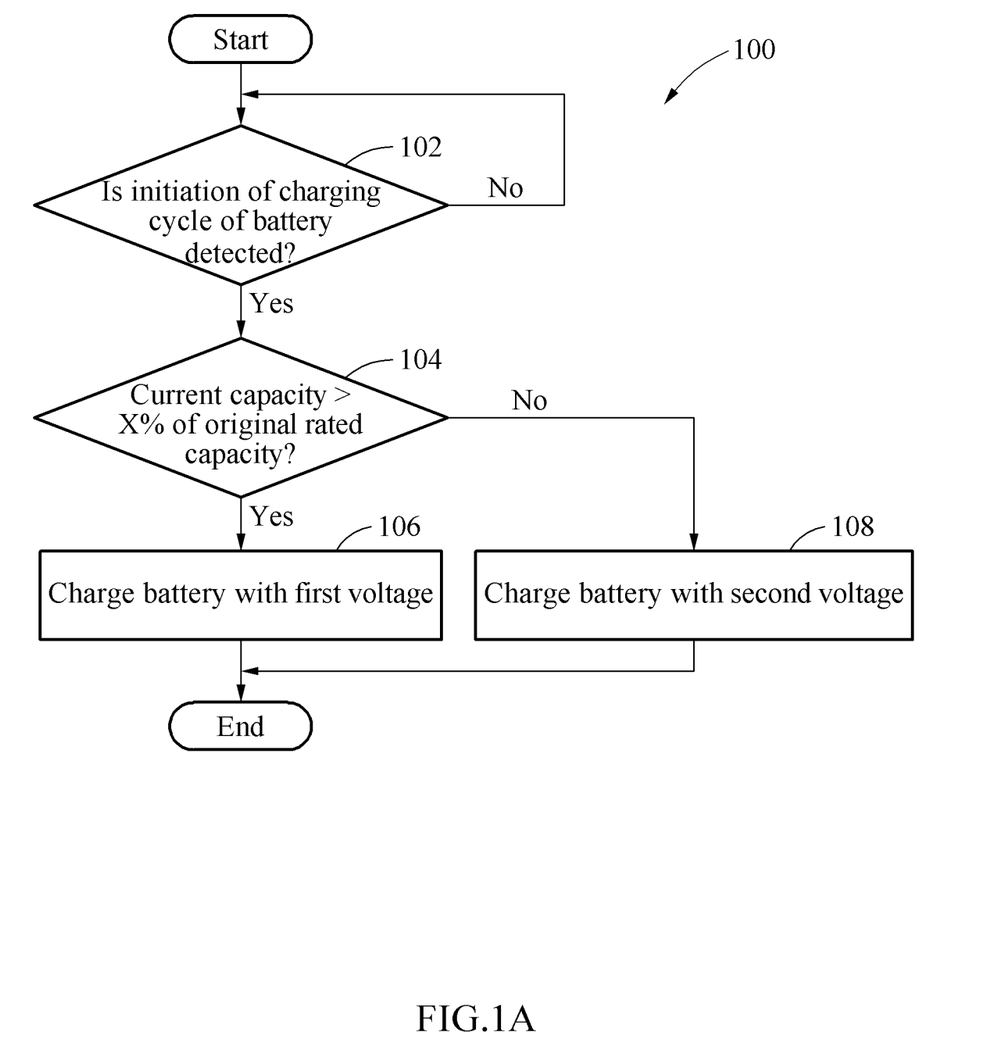
FIG. 1A is a flowchart illustrating an example method of charging a battery, in accordance with one or more embodiments.

FIG. 1A is a flowchart illustrating an example method 100 of charging a battery, in accordance with one or more embodiments.

Referring to FIG. 1A, the method 100 may be implemented by a battery management system (BMS) configured to control charging of a battery. The method 100 may be implemented by a BMS of user equipment, for example, a smartphone, a laptop, or a tablet, as non-limiting examples. The method 100 may be implemented by at least one component of a system 400 for charging a battery that will be described with reference to FIG. 4.

Referring to FIG. 1, in operation 102, a determination is made whether an initiation of a charging cycle of the battery is detected. The BMS that performs the method 100 may be configured to detect the initiation of the charging cycle of the battery. In an example, a user who wants to charge a battery of a device, for example, a smartphone, may connect a charging adapter to the smartphone and may connect the charging adapter to a power source. In this example, the user may turn on a switch to allow a current to flow from the power source to the smartphone. The initiation of the charging cycle may be detected by the BMS, for example, based on reception of the current from the power source.

When the initiation of the charging cycle of the battery is detected in operation 102, a determination is made whether a current capacity of the battery is greater than a predetermined threshold percentage (X %) of an original rated capacity of the battery in operation 104. For a given battery, a threshold percentage of the battery may be a percentage below which the battery is considered dead as per defined scientific standards of battery usage. In an example, the threshold percentage may be 81% of the original rated capacity of the battery. In an example, for a battery with an original rated capacity of 100 milliampere hour (mAh), a predetermined threshold percentage may be 81 mAh as 81% of 100 mAh. In this example, the BMS may determine whether the current capacity of the battery is greater than 81 mAh.

The current capacity of the battery may be determined based on voltage data, current data, and time data. The voltage data may include information about a voltage to which the battery is charged during previous charging cycles of the battery. The current data may include details of a current at which the battery is charged during previous charging cycles of the battery. The time data may include details of time associated with charging and discharging of a battery of a UE. For example, the current capacity of the battery may be determined, for example, as an area under curve (AUC) of current versus time data, that is, an integral of current with time.

When the current capacity of the battery is determined to be greater than the predetermined threshold percentage of the original rated capacity of the battery in operation 104, the battery may be charged with a first voltage in operation 106. In an example, to perform operation 106, the BMS may access a storage space including a value of the first voltage, and may identify the value of the first voltage, to charge the battery with the first voltage. In this example, the first voltage may be 4.2 volts (V), as a non-limiting example.

Additionally, the storage space may include a value of a second voltage that is equal to a sum of the value of the first voltage and a value of a predetermined voltage. The predetermined voltage may be 0.01 millivolt (mV) and may be stored in the storage space.

When the current capacity of the battery is determined to be less than or equal to the predetermined threshold percentage of the original rated capacity of the battery in operation 104, the battery may be charged with the second voltage in operation 108. As described above, the value of the second voltage may be equal to the sum of the value of the first voltage and the value of the predetermined voltage.

The value of the second voltage may be stored in a storage space connected to the BMS. To perform operation 108, the BMS may access the storage space including the value of the first voltage and the value of the second voltage and may identify the value of the second voltage, to charge the battery with the second voltage.

When the current capacity of the battery is determined to be less than or equal to the predetermined threshold percentage of the original rated capacity of the battery in operation 104, the value of the first voltage may be updated by adding the value of the predetermined voltage value to the value of the first voltage, and the updated value of the first voltage may be stored in the storage space for use in a subsequent charging cycle of the battery.

In an example, when the first voltage is 4.2 V, the predetermined voltage is 0.01 mV, and when the current capacity of the battery is less than or equal to the predetermined threshold percentage of the original rated capacity of the battery, the value of the first voltage may be increased to 4.201 V. Additionally, 4.201 V, as an updated value of the first voltage, may be stored in the storage space for use in a subsequent charging cycle of the battery.

As described above, the value of the second voltage may be equal to the sum of the value of the first voltage and the value of the predetermined voltage. In an example, when the value of the first voltage is updated, the value of the second voltage may also be automatically updated. In an example, a user may plug in a smartphone for a next charging. In this example, another determination may be made whether the current capacity is greater than the predetermined threshold percentage of the original rated capacity. When the current capacity is determined to be greater than the predetermined threshold percentage, the battery may be charged with 4.201 V, that is, the first voltage. When the current capacity is determined to be less than or equal to the predetermined threshold percentage, the battery may be charged with 4.202 V, that is, the second voltage.

In a non-limiting example, the battery may be an LIB. Additionally, the first voltage, the second voltage, the predetermined voltage and the predetermined threshold percentage for the battery may be properly adjusted and applied to other batteries.

Figure 1B:
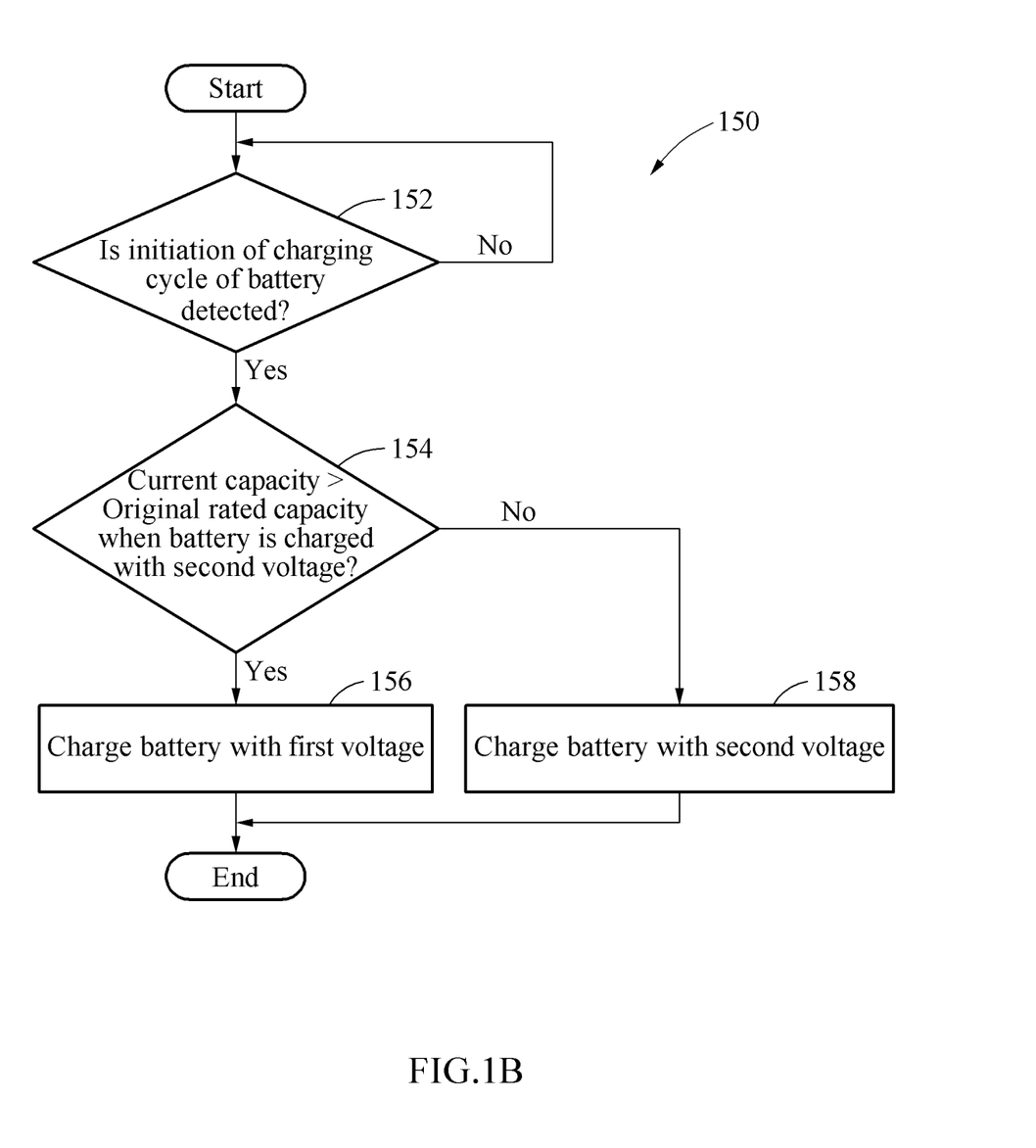
FIG. 1B is a flowchart illustrating an example method of charging a battery, in accordance with one or more embodiments.

FIG. 1B is a flowchart illustrating an example method 150 of charging a battery, in accordance with one or more embodiments.

Referring to FIG. 1B, the method 150 may be implemented by a BMS configured to control charging of a battery. The method 150 may be implemented by a BMS of user equipment, which may be, as non-limiting examples, a smartphone, a laptop, or a tablet. The method 150 may be implemented by at least one component of the system 400 that will be described with reference to FIG. 4.

Referring to FIG. 1B, in operation 152, a determination is made whether a charging cycle of the battery is initiated. The BMS that performs the method 150 may be configured to detect the initiation of the charging cycle of the battery. In an example, a user who wants to charge a battery of a smartphone may connect a charging adapter to the smartphone and may connect the charging adapter to a power source. In this example, the user may turn on a switch to allow a current to flow from the power source to the smartphone. The initiation of the charging cycle may be detected by the BMS, for example, based on reception of the current from the power source.

When the initiation of the charging cycle of the battery is detected in operation 152, a determination is made in operation 154 whether a current capacity of the battery exceeds an original rated capacity of the battery when the battery is charged with a second voltage.

To this end, the second voltage may be identified by accessing a storage space including a value of a first voltage and a value of the second voltage. The first voltage may be, as a non-limiting example, 3.5 V. The second voltage may be equal to the sum of the first voltage and the predetermined voltage. The predetermined voltage may be, as a non-limiting example, 0.01 mV. The second voltage identified in the storage space may be, as a non-limiting example, 3.51 V.

Hereinafter, operation 154 is further described.

In the method 150, by accessing voltage-capacity mapping information stored in a storage space, a capacity value corresponding to the second voltage may be identified based on the voltage-capacity mapping information, and a determination is made whether the identified capacity value is greater than the original rated capacity of the battery. In an example, when the identified capacity value is determined to be greater than the original rated capacity of the battery, the current capacity of the battery may be determined to exceed the original rated capacity of the battery when the battery is charged with the second voltage. In another example, when the identified capacity value is determined to be equal to or less than the original rated capacity of the battery, the current capacity of the battery may be determined to be equal to or less than the original rated capacity of the battery when the battery is charged with the second voltage. The voltage-capacity mapping information may be mapping information between a plurality of voltages and a plurality of capacities.

When the current capacity of the battery is determined to exceed the original rated capacity of the battery when the battery is charged with the second voltage in operation 154, the battery may be charged with the first voltage in operation 156.

When the current capacity of the battery is determined to be less than or equal to the original rated capacity of the battery when the battery is charged with the second voltage in operation 154, the battery may be charged with the second voltage in operation 158.

When the current capacity of the battery is determined to be less than or equal to the original rated capacity of the battery when the battery is charged with the second voltage in operation 154, the value of the first voltage may be updated by adding a value of the predetermined voltage to the value of the first voltage, and the updated value of the first voltage may be stored in a storage space for use in a subsequent charging cycle of the battery.

By implementing the method 150, a BMS of a UE may be configured to utilize a battery of the UE with a maximum capacity during approximately the same number of charging cycles as those of existing approaches.

Figure 2A:
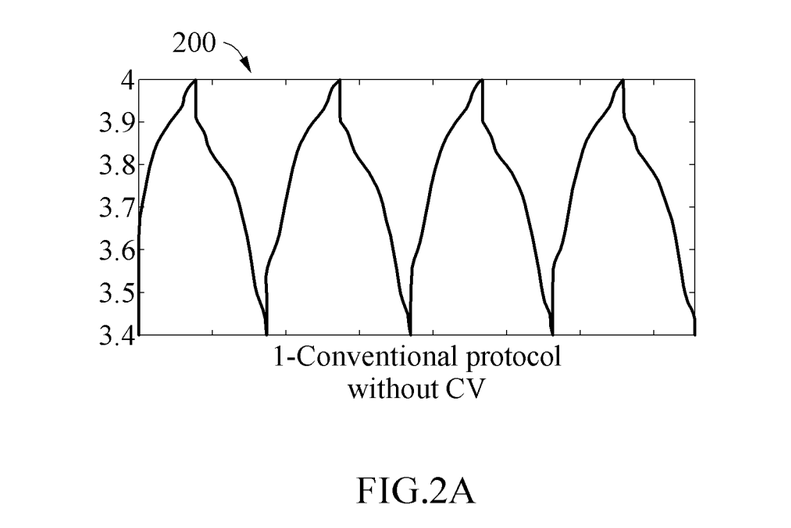
FIGS. 2A through 2C illustrate examples of performance of various charging protocols, in accordance with one or more embodiments.
Figure 2B:
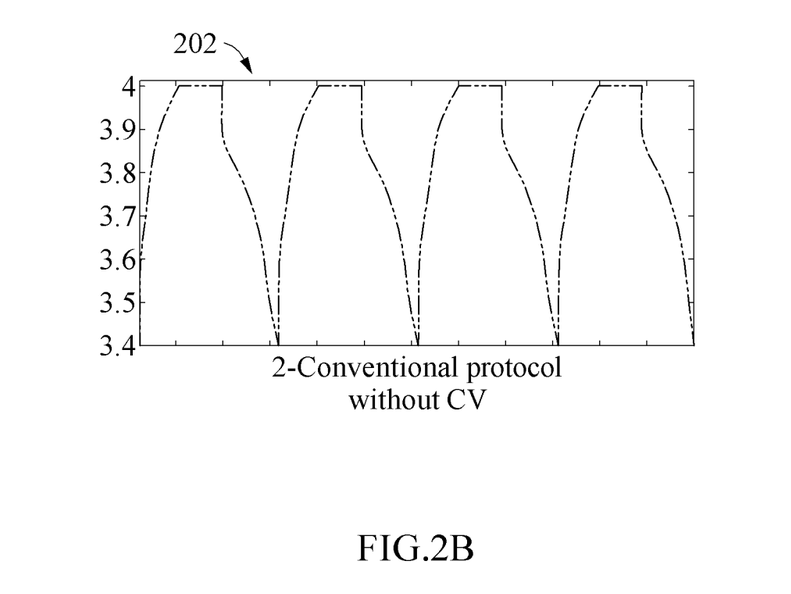
Figure 2C:
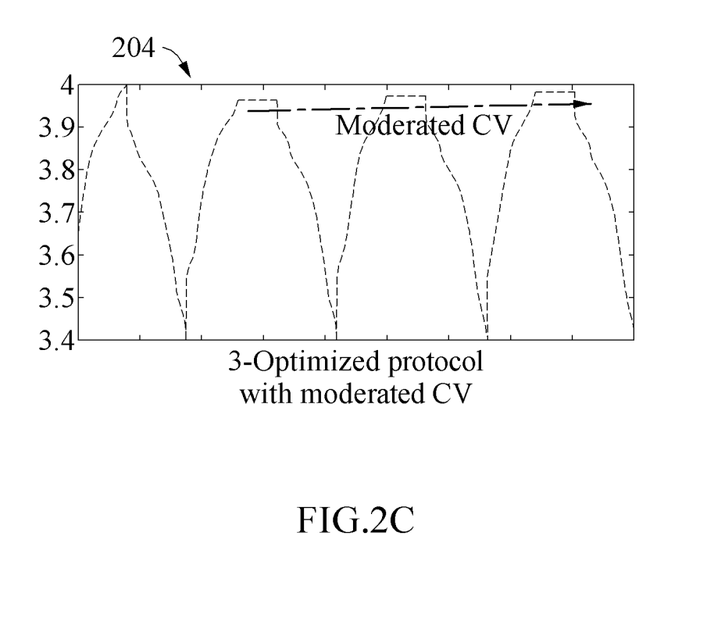

FIGS. 2A through 2C illustrate examples of performance of various charging protocols, in accordance with one or more embodiments.

FIG. 2A illustrates a graph 200 of a charging protocol without a CV, and FIG. 2B illustrates a graph 202 of a charging protocol with a CV. FIG. 2C illustrates a graph 204 of a charging protocol with a moderated CV.

At least one of the initial few charging cycles may not have a CV and subsequent charging cycles may be driven by a constant CV. In an example of lithium manganese oxide ($LiMn_2O_4$, "LMO")-based batteries that are a type of LIBs, a voltage at which a battery is to be charged may be initially capped, for example, at 4.2 V. When a battery capacity is equal to a preset value (for example, 80% of the original capacity), the voltage at which the battery to be charged may be increased. In this example, the voltage may be gradually and steadily increased. For example, a voltage at which an LMO-based battery is to be charged may be increased by 0.01V per charging cycle. In other words, when a battery is charged with 4.2 V to 80%, that is, a capacity of the battery reaches 80%, the voltage at which the battery is to be charged may be increased by 0.01V for each charging cycle. Thus, a voltage for first of the above cycles may be 4.201 V.

Figure 2D:
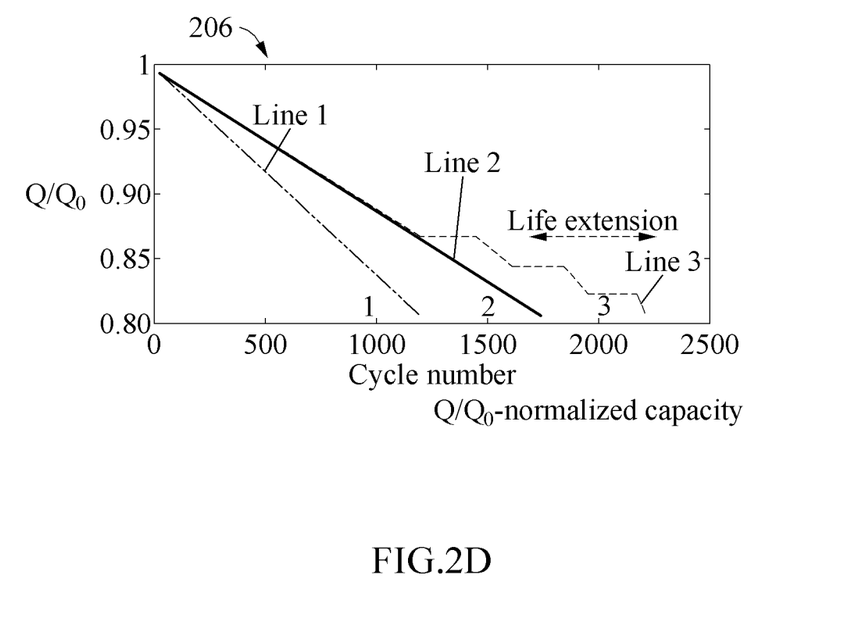
FIG. 2D illustrates an example of a life expectancy of a battery, in accordance with one or more embodiments.

FIG. 2D illustrates an example of a life expectancy of a battery.

FIG. 2D illustrates a graph 206 depicting a life expectancy of a battery in a number of charging life cycles. As shown in FIG. 2D, line 1 corresponding to the graph 200 provides a battery lifespan with about 1200 charging cycles. Similarly, line 2 corresponding to the graph 202 provides a battery lifespan of about 1600 to 1700 charging cycles. As shown in line 3 that is a solution proposed herein, a battery lifespan with about 2200 charging cycles may be provided.

Figure 3:
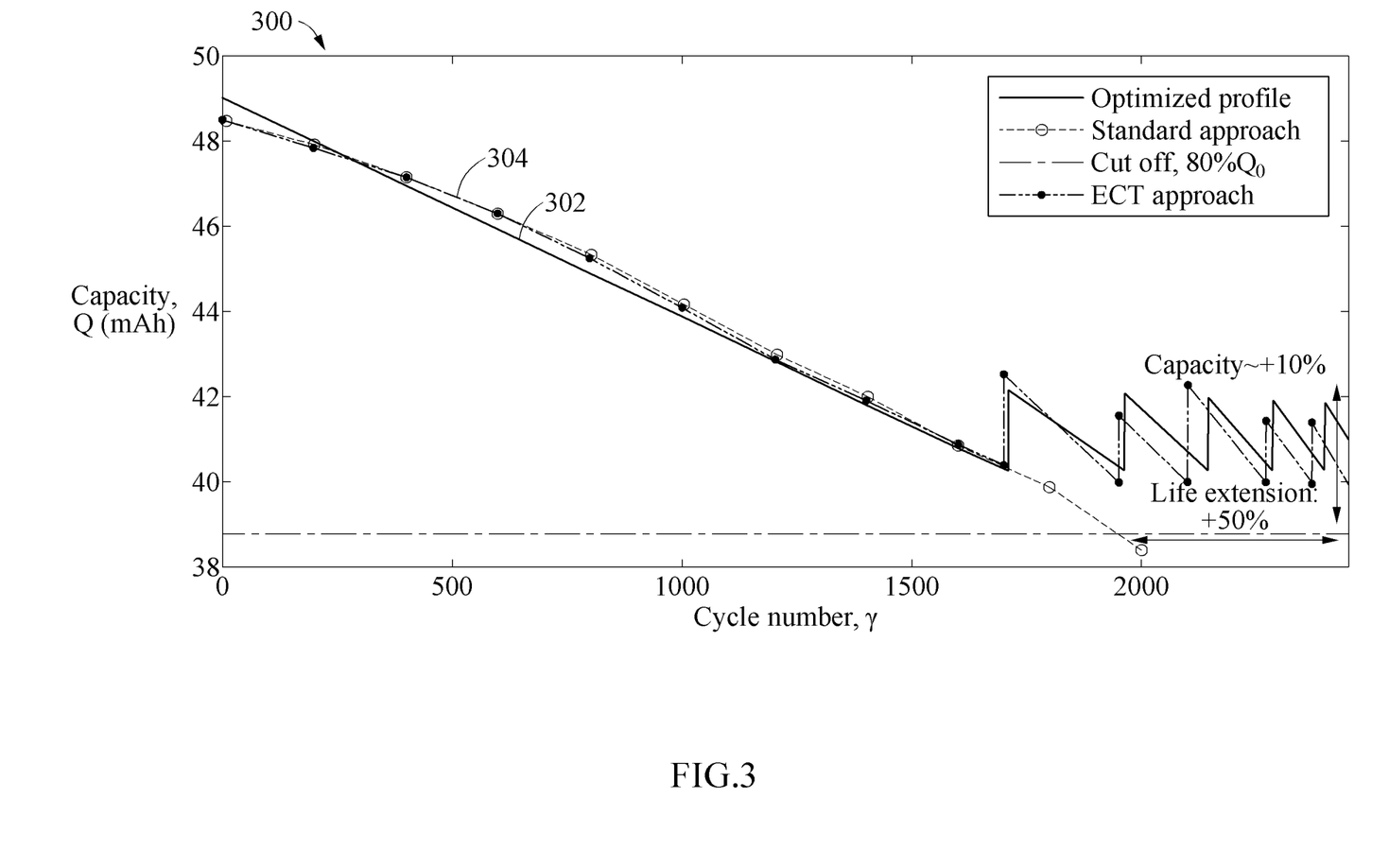
FIG. 3 illustrates an example of a voltage-capacity profile of a battery, in accordance with one or more embodiments.

FIG. 3 illustrates a graph 300 depicting a voltage-capacity profile of a battery, in accordance with one or more embodiments.

Referring to FIG. 3, a technology according to the present disclosure provides an increased battery lifespan indicated by a plot 302. An increased battery lifespan is also validated by an ECT equation plot 304.

Figure 4:
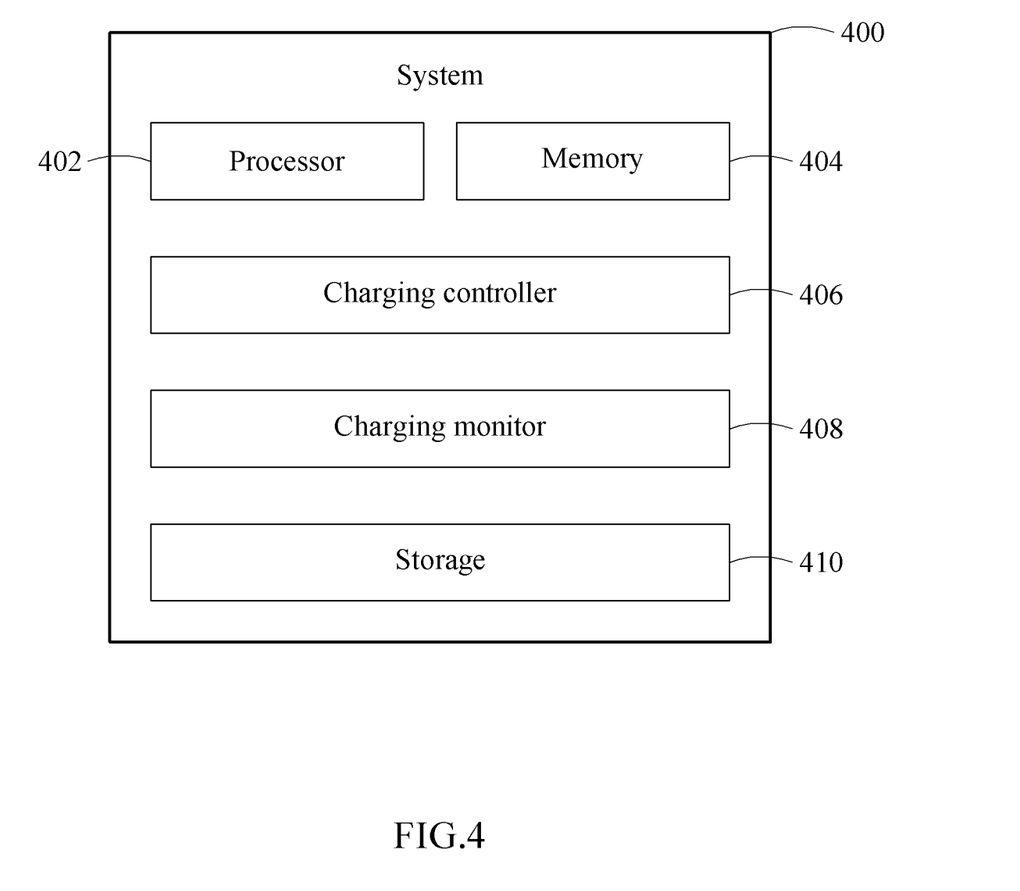
FIG. 4 illustrates an example configuration of a battery charging system, in accordance with one or more embodiments.

FIG. 4 illustrates an example of a configuration of the system 400.

Referring to FIG. 4, the system 400 may include a processor 402, a memory 404, a charging controller 406, a charging monitor 408, and a storage 410. The memory 404, the charging controller 406 and the charging monitor 408 may be coupled to the processor 402.

In an example, the processor 402 may be a single processor or a plurality of processors, all of which may include a plurality of computing elements. The processor 402 may be implemented as one or more microprocessors, microcomputers, microcontrollers, digital signal processors, central processing units, state machines, logic circuitries, and/or any devices that manipulate signals based on operational instructions. Among other capabilities, the processor 402 may be configured to fetch and execute computer-readable instructions and data stored in the memory 404.

The processor 402 may control an overall operation of the system 400. Also, the processor 402 may perform functions of the charging controller 406 and the charging monitor 408. The processor 402, the charging controller 406, and the charging monitor 408 are separately illustrated to distinguish functions thereof. Thus, the processor 402 may include at least one processor configured to perform respective functions of the charging controller 406 and the charging monitor 408. Also, the processor 402 may include at least one processor configured to perform a portion of the respective functions of the charging controller 406 and the charging monitor 408.

The memory 404 may include any non-transitory computer-readable medium known in the art that includes, for example, a volatile memory, such as a static random access memory (SRAM) and a dynamic random access memory (DRAM), and a non-volatile memory, such as read-only memory (ROM), an erasable programmable read-only memory (EPROM), flash memories, hard disks, optical disks, and magnetic tapes.

The charging controller 406 and the charging monitor 408 may include routines, programs, objects, components, data structures, and the like, which perform a predetermined task or implement data types. The charging controller 406 and the charging monitor 408 may also be implemented as, signal processors, state machines, logic circuitries, and/or any other devices or components that manipulate signals based on operational instructions. Also, the charging controller 406 and the charging monitor 408 may be implemented in hardware, instructions executed by a processing unit, or by a combination thereof. The processing unit may include a computer, a processor, such as the processor 402, a state machine, a logic array, or any other suitable devices capable of processing instructions. The processing unit may be a general-purpose processor that executes instructions to cause the general-purpose processor to perform a required task, or may be dedicated to performing a required function.

The charging controller 406 and the charging monitor 408 may be machine-readable instructions (software) executed by a processor/processing unit to perform one of the above-described functions. The storage 410 may function as a repository for storing data processed, received, and generated by at least one of the processor 402, the charging controller 406 and the charging monitor 408.

The storage 410 may include a value of a first voltage, a value of a second voltage, a predetermined threshold percentage of an original rated capacity, and a value of a predetermined voltage.

The above-described components of the system 400 may be implemented in a single device, for example, a smartphone, and may control at least one charging circuitry or may transmit data to a charging adapter to control an operation of the charging circuitry.

At least one of the above-described components of the system 400 may be implemented in a distributed manner. For example, the charging controller 406 may be provided in the charging adapter to control the operation of the charging circuitry and may receive data including instructions from the charging monitor 408.

The system 400 may be configured to provide a physics-based approach to charge a battery. For example, the system 400 may be configured to control a value of a voltage to which a battery may be charged, to best optimize a lifespan of the battery. In an example, the system 400 may take into consideration factors that result in degradation, and may implement the best scenario of changing a voltage value to which a battery may be charged to maximize a lifespan of the battery. For brevity, further description of the examples that have been already provided above are not repeated herein.

The charging controller 406 may be configured to charge a battery. In an example, the charging controller 406 may control a charging circuitry that charges the battery, to charge the battery based on data and instructions received from the charging monitor 408.

Hereinafter, an example of an operation of the charging monitor 408 is further described with reference to FIGS. 1A and 1B.

In the example of FIG. 1A, the charging monitor 408 may detect the initiation of a charging cycle of a battery, and may determine whether a current capacity of the battery is greater than a predetermined threshold percentage of an original rated capacity of the battery in response to the detection of the initiation of the charging cycle of the battery.

In an example, when the current capacity of the battery is determined to be greater than the predetermined threshold percentage of the original rated capacity of the battery, the charging monitor 408 may control the charging controller 406 to charge the battery with the first voltage. In this example, the charging monitor 408 may identify the value of the first voltage in the storage 410 by accessing the storage 410 including the value of the first voltage.

In another example, when the current capacity of the battery is determined to be less than or equal to the predetermined threshold percentage of the original rated capacity of the battery, the charging monitor 408 may control the charging controller 406 to charge the battery with the second voltage. In this example, the charging monitor 408 may identify the value of the second voltage in the storage 410 by accessing the storage 410 including the value of the first voltage and the value of the second voltage. The second voltage may be equal to a sum of the first voltage and the predetermined voltage.

When the current capacity of the battery is determined to be less than or equal to the predetermined threshold percentage of the original rated capacity of the battery, the charging monitor 408 may update the value of the first voltage by adding the value of the predetermined voltage to the value of the first voltage, and may store the updated value of the first voltage in the storage 410 to be implemented in a subsequent charging cycle of the battery. The value of the second voltage stored in the storage 410 may also be automatically updated based on the value of the first voltage.

The predetermined voltage may be, as a non-limiting example, 0.01 mV, the first voltage may be, as a non-limiting example, 4.2V, and the battery may be an LIB.

In the example of FIG. 1B, the charging monitor 408 may detect the initiation of a charging cycle of a battery, and may determine whether a current capacity of the battery exceeds an original rated capacity of the battery when the battery is charged with the second voltage in response to the initiation of the charging cycle of the battery being detected. The charging monitor 408 may identify the second voltage by accessing the storage 410 including the value of the first voltage and the value of the second voltage. In this example, the first voltage may be 3.5 V, and a predetermined voltage may be 0.01 mV. The second voltage may be equal to a sum of the first voltage and the predetermined voltage, and accordingly 3.51 V may be identified as a value of the second voltage in the storage 410.

The charging monitor 408 may determine whether a current capacity of the battery exceeds an original rated capacity of the battery when the battery is charged with the second voltage.

The charging monitor 408 may access voltage-capacity mapping information stored in the storage 410, may identify a capacity value corresponding to the second voltage based on the voltage-capacity mapping information, and may determine whether the identified capacity value is greater than the original rated capacity of the battery. The voltage-capacity mapping information may be, for example, mapping information between a plurality of voltages and a plurality of capacities.

When the identified capacity value is determined to be greater than the original rated capacity, the charging monitor 408 may determine that the current capacity of the battery exceeds the original rated capacity of the battery when the battery is charged with the second voltage.

When the identified capacity value is determined to be less than or equal to the original rated capacity, the charging monitor 408 may determine that the current capacity of the battery is less than or equal to the original rated capacity of the battery when the battery is charged with the second voltage.

When the current capacity of the battery is determined to exceed the original rated capacity of the battery when the battery is charged with the second voltage as the above determination result, the charging monitor 408 may control the charging controller 406 to charge the battery with the first voltage.

When the current capacity of the battery is determined to be less than or equal to the original rated capacity of the battery when the battery is charged with the second voltage as the above determination result, the charging monitor 408 may control the charging controller 406 to charge the battery with the second voltage.

Additionally, when the current capacity of the battery is determined to be less than or equal to the original rated capacity of the battery when the battery is charged with the second voltage as the above determination result, the charging monitor 408 may update the value of the first voltage by adding the value of the predetermined voltage to a value of the first voltage, and may store the updated value of the first voltage in the storage 410 for use in a subsequent charging cycle of the battery.

Detailed knowledge of a degradation reaction during a cycle may be used to arrive at an optimal charging protocol with dynamically varying charging parameters that extend a cycle life. In the examples, an LMO-based LIB using LMO as a cathode material may be used and described as an example. The LMO-based LIB is a candidate product for an electric vehicle (EV), a hybrid electric vehicle (HEV), and other applications due to its favorable characteristics of a high rate capability and cell potential combined with a low cost and environmentally benign nature.

The LMO-based LIB may be used either as a single component or used in combination with lithium nickel manganese cobalt oxide (NMC) that is a high capacity cathode material, to obtain benefits of both. Thus, the LMO-based LIB may be selected because of its popularity as a candidate for cathodes, and also because performance degradation mechanisms seem to be well understood and studied.

Thus, a typical relevant system is chosen to show a common feature across battery chemistries. A degradation signature common in most chemistries may be highlighted, which may be an effect of high/low voltage windows on degradation.

In most lithium metal oxides, for example, lithium cobalt oxide ($LiCoO_2$), metal dissolution may be performed at a predetermined voltage (cobalt dissolution above 4.2V) or greater. Many other cathode materials, for example, lithium iron phosphate ($LiFePO_4$, "LFP"), also show cutoff voltage-based degradation in Table 1 below.

TABLE 1

| Cathode material | Degradation Mechanism | Charging cutoff voltage |
|---|---|---|
| NCA | Cathode SEI formation | 4.3 |
| LMO | Manganese dissolution | 4.0 |
| $LiCoO_2$ | Cobalt dissolution | 4.2 |
| $LiFePO_4$ | Lithium deposition | 3.55 |

In the present disclosure, the LMO-based LIB may be elaborated to implement the charging protocol. Thus, a candidate LMO may represent a wide range of chemistries degraded due to the same feature. Combining electrochemical understanding especially of degradation with the charging protocol through the LMO may greatly benefit the health of a battery, and thus it may be possible to maximize benefits of a lifespan with an optimized capacity output.

A typical spinel LMO system may undergo capacity fading with cycling due to manganese dissolution at a high voltage, and may be quite sensitive to a cutoff voltage. Degradation phenomena are complex and intertwined and detailed physics underlying should be taken into consideration for better utilization of battery capabilities. Details of degradation in an electrochemical LIB model to propose an optimized charging protocol may be included to extend a cycle life of the LMO-based LIB, which may be extended to other chemistries, with degradation affected by low voltages and/or high voltages, through appropriate modifications.

Figure 5A:
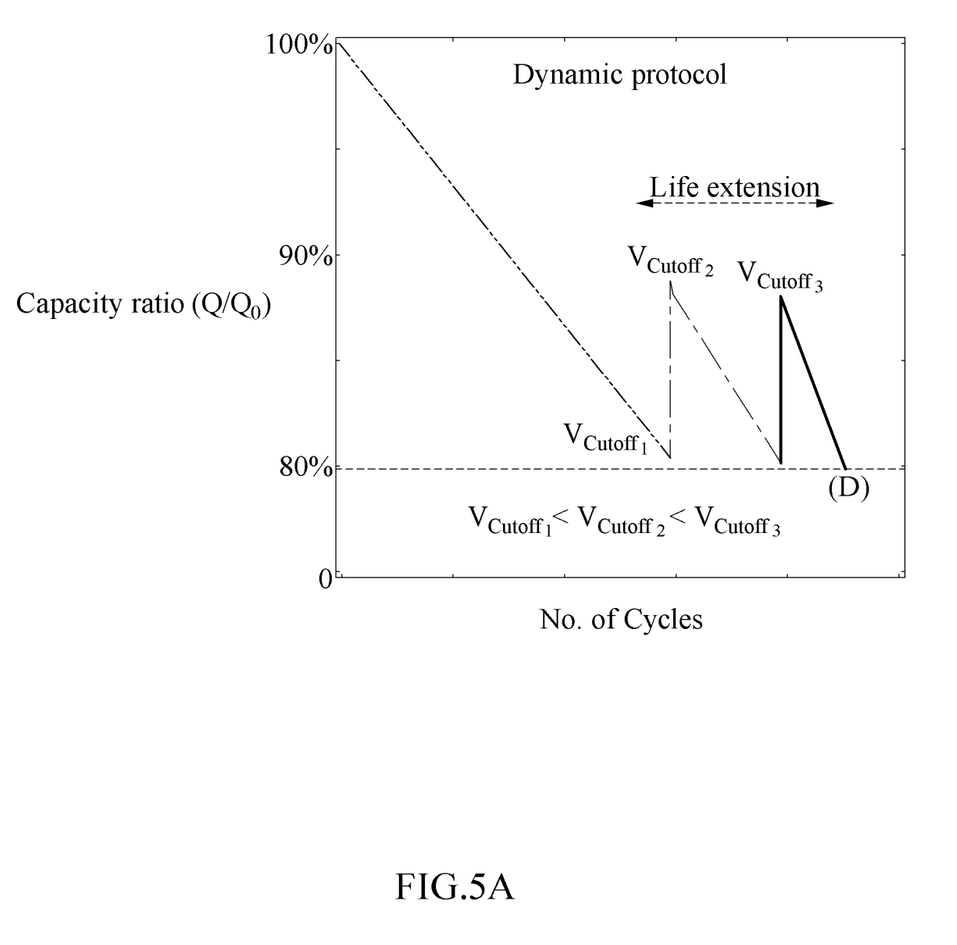
FIG. 5A illustrates an example of an enhanced life expectancy of a battery, in accordance with one or more embodiments.

FIG. 5A illustrates an example of an enhanced life expectancy of a battery, in accordance with one or more embodiments.

Figure 5B:
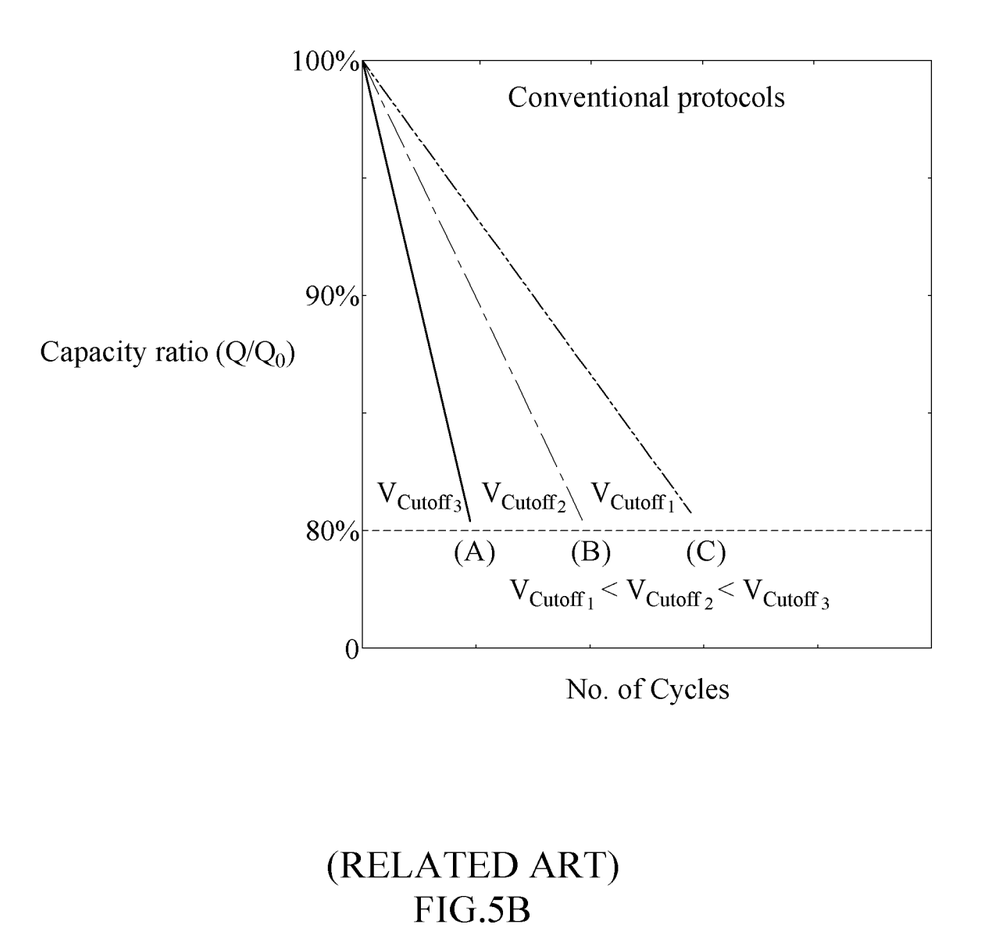
FIG. 5B illustrates an example of a life expectancy of a battery by a typical cut-off-based protocol.

FIG. 5B illustrates an example of a life expectancy of a battery by a typical cut-off-based protocol.

Referring to FIGS. 5A and 5B, in the present disclosure, a concept of a trade-off between capacity extraction at higher cutoff voltages and parallel and enhanced side-effects on capacity fading through degradation may be used while designing an optimized dynamic charging protocol as summarized in FIG. 5A, in comparison with the existing cut-off-based protocol of FIG. 5B.

As shown in FIG. 5A, it may be confirmed that degradation, a capacity loss and voltage windows are optimized based on physics information, which may lead to an increase in a lifespan of a battery up to 50%, instead of compromising on an extractable capacity.

The system 400, processor 402, memory 404, charging controller 406, charging monitor 408, storage 410, that perform the operations described in this application are implemented as and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, and multiple-instruction multiple-data (MIMD) multiprocessing.

The methods illustrated in FIGS. 1-5A that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery management system (BMS) comprising:
a charging controller, configured to charge a battery; and
a charging monitor configured to:
   detect an initiation of a charging cycle of the battery,
   determine whether a current capacity of the battery is greater than a predetermined threshold percentage of an original rated capacity of the battery in response to a detection of the initiation of the charging cycle of the battery,
   control the charging controller to charge the battery with a first voltage in response to the current capacity of the battery being determined to be greater than the predetermined threshold percentage of the original rated capacity of the battery, and
   charge the charging controller to charge the battery with a second voltage in response to the current capacity of the battery being determined to be less than or equal to the predetermined threshold percentage of the original rated capacity of the battery,
      wherein the charging contoller is configured to generate an updated value by adding a predetermined value to a first value of the first voltage, in response to the current capaticy of the battery being determined to be less than or equal to the predetermined threshold percentage of the original rated capacity of the battery.

2. The system of claim 1, further comprising:
a storage storying the updated value and the first value,
wherein the charging monitor is further configured to identify the first value in the storage in response to the current capacity of the battery being determined to be greater than the predetermined threshold percentage of the original rated capacity of the battery.

3. The system of claim 1, wherein a second value the second voltage is equal to a sum of the first value and the predetermined value.

4. The system of claim 3, further comprising:
a storage storing the updated value, the first value, and a second value of the second voltage,
wherein the charging monitor is configured to identify the second value of the second voltage in the storage in response to the current capacity of the battery being determined to be less than or equal to the predetermined threshold percentage of the original rated capacity of the battery.

5. The system of claim 4, wherein the charging controller is further configured to store the updated value of the first voltage in the storage to be implemented in a subsequent charging cycle of the battery, in response to the current capacity of the battery being determined to be less than or equal to the predetermined threshold percentage of the original rated capacity of the battery.

6. The system of claim 3, wherein
the predetermined value is 0.01 millivolt (mV), and
wherein the first value is 4.2 volts (V).

7. The system of claim 1, wherein the battery comprises a lithium-ion battery.

8. A method of controlling charging of a battery, the method comprising:
detecting an initiation of a charging cycle of the battery;
determining whether a current capacity of the battery is greater than a predetermined threshold percentage of an original rated capacity of the battery, in response to a detection of the initiation of the charging cycle of the battery;

controlling the battery to be charged with a first voltage, in response to the current capacity of the battery being determined to be greater than the predetermined threshold percentage of the original rated capacity of the battery; and controlling the battery to be charged with a second voltage, in response to the current capacity of the battery being determined to be less than or equal to the predetermined threshold percentage of the original rated capacity of the battery, and updating a first value of the first voltage by adding a predetermined value to the first value, in response to the current capacity of the battery being determined to be less than or equal to the predetermined threshold percentage of the original rated capacity of the battery.

9. The method of claim 8, wherein the controlling of the battery to be charged with the first voltage comprises identifying the first in a storage space, and
wherein the storage space is configured to store the first value.

10. The method of claim 8, wherein a second value of the second voltage is equal to a sum of the first value and the predetermined value.

11. The method of claim 10, wherein the controlling of the battery to be charged with the second voltage comprises identifying the second value in a storage space, wherein the storage space is configured to store the first value and the second value.

12. The method of claim 11, further comprising:
storing the updated value in the storage space to be implemented in a subsequent charging cycle of the battery.

13. The method of claim 10, wherein
the predetermined value is 0.01 millivolt (mV), and
wherein the first value is 4.2 volts (V).

14. The method of claim 8, wherein the battery is a lithium-ion battery.

15. A method of controlling charging of a battery, the method comprising:
detecting an initiation of a charging cycle of the battery;
determining whether a current capacity of the battery exceeds an original rated capacity of the battery when the battery is charged with a second voltage, in response to a detection of the initiation of the charging cycle of the battery;
controlling the battery to be charged with a first voltage, in response to the current capacity of the battery being determined to exceed the original rated capacity of the battery; and
controlling the battery to be charged with a second voltage, in response to the current capacity of the battery being determined to be less than or equal to the original rated capacity of the battery, and
updating a first value of the first voltage by adding a predetermined value to the first value, in response to the current capacity of the battery.

16. The method of claim 15, wherein the determining of whether the current capacity of the battery exceeds the original rated capacity of the battery when the battery is charged with the second voltage comprises:
accessing voltage-capacity mapping information stored in a storage space, the voltage-capacity mapping information comprising mapping information between a plurality of voltages and a plurality of capacities;
identifying a capacity value corresponding to the second voltage based on the voltage-capacity mapping information;
determining whether the identified capacity value is greater than the original rated capacity of the battery;
determining that the current capacity of the battery exceeds the original rated capacity of the battery when the battery is charged with the second voltage, in response to the identified capacity value being greater than the original rated capacity; and
determining that the current capacity of the battery is less than or equal to the original rated capacity of the battery when the battery is charged with the second voltage, in response to the identified capacity value being less than or equal to the original rated capacity.

17. The method of claim 15, wherein a second value of the second voltage is equal to a sum of the first value and the predetermined value.

18. The method of claim 15, further comprising:
identifying a second value of the second voltage in a storage space, wherein the storage space is configured to store the first value and the second value.

19. The method of claim 16, wherein the determining that the current capacity of the battery is less than or equal to the original rated capacity of the battery comprises:
storing the updated value of the first voltage in the storage space to be implemented in a subsequent charging cycle of the battery.

20. The method of claim 15, wherein the first value is 3.5 volts (V).

* * * * *